June 5, 1951 G. L. OTT ET AL 2,555,701
ANIMAL TONG
Filed April 3, 1947

INVENTORS
GEORGE L. OTT and
KENNETH L. MILLS
BY Robert J. Leahy
ATTORNEY

UNITED STATES PATENT OFFICE 2,555,701

ANIMAL TONG

George L. Ott and Kenneth L. Mills,
Poynette, Wis.

Application April 3, 1947, Serial No. 739,046

1 Claim. (Cl. 128—19)

This invention relates to an animal tongs. More, particularly, it relates to a tongs suitable for opening and retaining open the jaws of small animals, such as mink, while holding securely the upper and lower jaws of the animal.

Several prior investigators have suggested devices for holding open the mouths of animals, some of which have jaw clamps. These are all based on a bit device which the animal snaps at and grasps. The devices are complicated and so constructed that the animal's jaws are ordinarily gripped from the front of the animal. This constitutes an obstacle and makes it difficult to examine the animal's mouth and throat.

This difficulty was recognized by Jenkins in U. S. Patent No. 2,183,480, but his device is also based on the principle wherein the animal grasps a bit. While this tool may be useful on larger animals such as foxes, it is not suitable for use on small animals, such as minks. Mink do not ordinarily snap at objects offered, such as the bit portion of the tongs, and instead their mouths must be pried or forced open. Furthermore, because of their small mouths, a small instrument is essential to allow room for an examination and treatment.

It is, therefore, the object of this invention to provide an instrument adapted to opening and retaining open the jaws of small animals, such as mink, while holding securely the upper and lower jaws of the animal.

Another object is to provide a device which can be inserted behind the incisor teeth of a small animal; thus the mouth of the animal is pried or forced open.

A further object of our invention is to provide an animal tongs which is simple and reasonable to manufacture.

Other objects will be apparent from the accompanying drawing and description.

Now, in accordance with our invention, we have devised a novel animal tongs adapted to be inserted from the side of an animal's mouth while its mouth is closed, comprising a pair of handles pivotally secured together, the upper end of each having a bit point and a gripping jaw as an integral part thereof.

In the accompanying drawing.

Like numerals throughout the several views designate corresponding parts.

Figure 1:
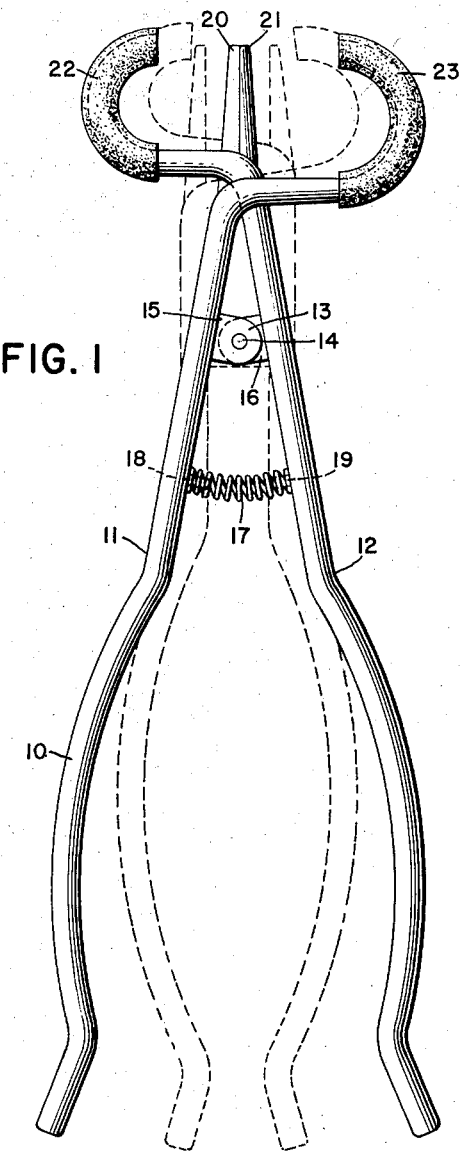
Fig. 1 is a side elevation view of the animal tongs in normal position, with the tongs in operating position being shown in dotted lines.
Figure 2:
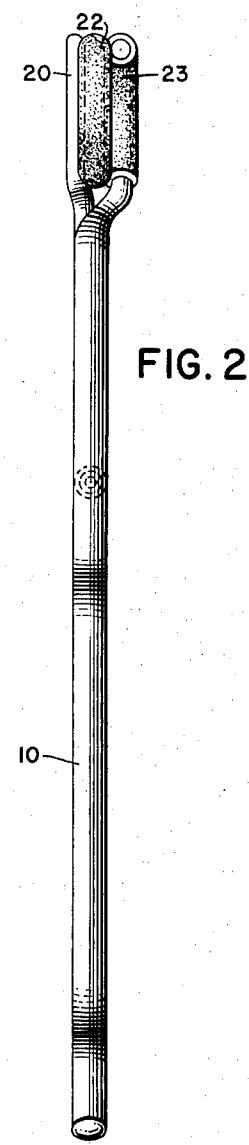
Fig. 2 is a top plan view of the animal tongs of Fig. 1.
Figure 3:
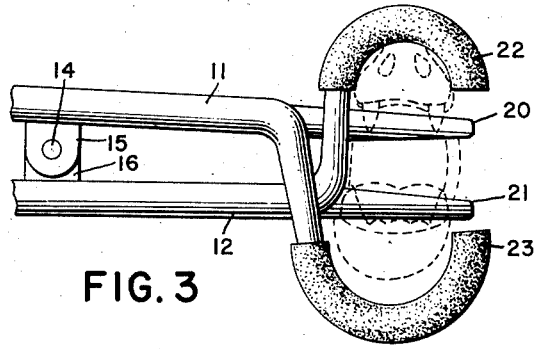
Fig. 3 is a partial view showing the application of the tongs in the treatment of an animal.

Referring now more particularly to the drawing, 10 indicates the tool as a whole which might generally be described as an animal tong formed with handles 11 and 12, preferably of tool steel, which are pivoted together at 13, and secured by means of a rivet 14, so that the handles may be drawn together or spread apart to operate the tool according to requirements. A convenient method of forming the pivot is to bifurcate the metal portion 15 forming a part of handle 11, and insert the metal portion 16 forming a part of handle 12 into the bifurcated portion of metal portion 15 and secure together by means of a rivet, screw, bolt or the like.

The upper end of each of the handles 11 and 12 is bifurcated, one portion of each end being extended to form bit points 20 and 21, and the other portion of each end being shaped to form gripping jaws 22 and 23, which are preferably covered with rubber tubing. It will be noted that the jaws 22 and 23 should be shaped to conform to the upper jaw and lower jaw of the animal to be grasped. While it is essential that the bit points 20 and 21 and the gripping jaws 22 and 23 be an integral part of the handles 11 and 12, if desired, the gripping jaws 22 and 23 and/or the bit points 20 and 21 may be welded or securely affixed to the upper portion of the handles 11 and 12 and thus made an integral part thereof.

A coil spring 17 is positioned between the handles 11 and 12 and held in place by metal studs 18 and 19, which are affixed to the handles 11 and 12 respectively. When the animal tongs are in normal position, as shown in Fig. 1, the coil spring 17 spreads apart the handles 11 and 12 while the bit points 20 and 21 are in close relationship. When the handles 11 and 12 are compressed, the bit points 20 and 21 are correspondingly spread apart while the gripping jaws 22 and 23 are compressed, as shown by the dotted lines in Fig. 1.

In using our animal tongs, the instrument in normal position is taken in one hand, and the bit points 20 and 21 are inserted into the side of a small animal's mouth, such as a mink, directly behind the incisor teeth. Ordinarily a mink will not bite or snap at the bit points, but rather keeps its mouth tightly closed. After the bit points 20 and 21 are positioned in the animal's mouth, its mouth is easily forced open by simply compressing the handles 11 and 12, thus spreading the bit points 20 and 21, and at the same time the head of the animal is held securely by the gripping jaws 22 and 23, one being positioned over the animal's nose, and upper jaw, and the other clamping its lower jaw.

The animal tongs we have devised is an efficient instrument which allows a thorough examination of the animal's mouth and throat. It is easy to operate with one hand, thus leaving the other hand free, and can be manufactured economically.

Although we have shown and described a preferred embodiment of this invention, it is to be understood that modifications may be made within the scope of the claim, without departing from the spirit or scope thereof.

We claim:

An animal tongs adapted to be inserted from the side of an animal's mouth comprising a pair of handles pivotally secured together, the upper ends of said handles being bifurcated, one portion of each bifurcated end being extended to form a rigid tapering bit point, and the other portion being shaped into a rigid gripping jaw adapted to conform to the upper and lower jaws of the animal, said bit points and gripping jaws being an integral part of the whole of said handles, the compressing of said handles acting to expand said bit points and simultaneously compress said gripping jaws.

GEORGE L. OTT.
KENNETH L. MILLS.

REFERENCES CITED

The following references are of record in the file of this patent:

UNITED STATES PATENTS

| Number | Name | Date |
|---|---|---|
| 421,598 | Monto | Feb. 18, 1890 |
| 1,694,713 | MacLean, Jr. | Dec. 11, 1928 |
| 1,761,926 | Landers | June 3, 1930 |
| 1,875,158 | Rombough | Aug. 30, 1932 |
| 2,183,480 | Jenkins | Dec. 12, 1939 |

FOREIGN PATENTS

| Number | Country | Date |
|---|---|---|
| 376,293 | Italy | Nov. 9, 1939 |